(12) United States Patent
Urano et al.

(10) Patent No.: US 11,341,866 B2
(45) Date of Patent: May 24, 2022

(54) SYSTEMS AND METHODS FOR TRAINING A DRIVER ABOUT AUTOMATED DRIVING OPERATION

(71) Applicant: Toyota Research Institute, Inc., Los Altos, CA (US)

(72) Inventors: Hiromitsu Urano, Numazu (JP); Kentaro Ichikawa, Sunto-gun (JP); Junya Ueno, Susono (JP)

(73) Assignee: Toyota Research Institute, Inc., Los Altos, CA (US)

(*) Notice: Subject to any disclaimer, the term of this patent is extended or adjusted under 35 U.S.C. 154(b) by 11 days.

(21) Appl. No.: 16/916,436

(22) Filed: Jun. 30, 2020

(65) Prior Publication Data
US 2021/0407319 A1    Dec. 30, 2021

(51) Int. Cl.
*G09B 19/00* (2006.01)
*G09B 19/16* (2006.01)
(Continued)

(52) U.S. Cl.
CPC ........... *G09B 19/167* (2013.01); *B60W 40/09* (2013.01); *B60W 60/001* (2020.02); *B60W 60/0051* (2020.02); *B60W 60/0053* (2020.02); *B60W 60/0059* (2020.02); *B60W 2510/18* (2013.01)

(58) Field of Classification Search
CPC ............ G09B 19/167; B60W 60/0059; B60W 60/0051; B60W 60/001; B60W 60/0053; B60W 40/09; B60W 2510/18
See application file for complete search history.

(56) References Cited

U.S. PATENT DOCUMENTS 6,879,969 B2 *  4/2005  Engstrom .......... G06K 9/00335
                                                        706/20
9,754,325 B1     9/2017  Konrardy et al.
(Continued)

FOREIGN PATENT DOCUMENTS

| EP | 3601005 A1 | 2/2020 | |
| FR | 3063958 A1 * | 9/2018 | ............. B60K 35/00 |
| WO | 2018172648 A1 | 9/2018 | |

OTHER PUBLICATIONS

Favaro, et al., "Analysis of Disengagements in Semi-Autonomous Vehicles: Drivers' Takeover Performance and Operational Implications," Project 1710, Jun. 2019, 83 pages, Pub. Mineta Transportation Institute.

(Continued)

*Primary Examiner* — Peter D Nolan
*Assistant Examiner* — Peter Y Ning
(74) *Attorney, Agent, or Firm* — Christopher G. Darrow; Darrow Mustafa PC

(57) ABSTRACT

System, methods, and other embodiments described herein relate to improving the training of a driver during automated driving system mode. In one embodiment, a method includes generating, in association with a vehicle takeover and a maneuver by the driver, an automated motion plan associated with the maneuver. The method also includes determining if a difference parameter satisfies a threshold, wherein the difference parameter indicates a disparity between the maneuver by the driver in relation to the automated motion plan associated with the maneuver. The method also includes notifying, if the difference parameter does not satisfy the threshold, the driver that the vehicle takeover and the maneuver by the driver were unnecessary.

20 Claims, 9 Drawing Sheets

(51) Int. Cl.
    *B60W 60/00*        (2020.01)
    *B60W 40/09*        (2012.01)

(56) References Cited

U.S. PATENT DOCUMENTS

| | | |
|---|---|---|
| 9,873,427 B2 | 1/2018 | Danzl et al. |
| 10,157,321 B2 | 12/2018 | Becker et al. |
| 10,496,090 B2 | 12/2019 | Latotzki et al. |
| 10,571,911 B2 | 2/2020 | Prokhorov |
| 10,599,141 B2 | 3/2020 | Liu et al. |
| 2017/0061826 A1* | 3/2017 | Jain .................. G09B 19/167 |
| 2017/0305434 A1* | 10/2017 | Ratnasingam ......... G06N 20/00 |
| 2018/0018895 A1* | 1/2018 | Chan .................. G05D 1/021 |
| 2018/0067486 A1* | 3/2018 | Yako .................. G05D 1/0088 |
| 2019/0291728 A1* | 9/2019 | Shalev-Shwartz ........................... B60W 30/165 |
| 2020/0017124 A1* | 1/2020 | Camhi .................. G06N 20/00 |
| 2020/0183411 A1* | 6/2020 | Oba .................. H04N 17/002 |
| 2020/0377111 A1* | 12/2020 | Misu .................. G06F 11/3058 |
| 2020/0377116 A1* | 12/2020 | Abrashov ............. B60W 50/14 |

OTHER PUBLICATIONS

Carolyn Said, "Self-Driving Cars See Less Human Intervention in California," San Francisco Chronicle, Feb. 14, 2019, pp. 1-2, found at: https://www.govtech.com/templates/gov_print_article?id-505839171.

\* cited by examiner

SYSTEMS AND METHODS FOR TRAINING A DRIVER ABOUT AUTOMATED DRIVING OPERATION

TECHNICAL FIELD

The subject matter described herein relates, in general, to automated driving systems (ADSs), and, more particularly, to the training of a driver about ADS operation.

BACKGROUND

Vehicles are equipped with autonomous driving modules, as part of an automated driving system (ADS), for automated driving. A driver may need training to learn about the capabilities, reliability, and limits of automated driving mode for a particular vehicle. A driver accustomed to level 1 or 2 automated driving may also need training for higher-level modes of automated driving. Also, an experienced driver may need re-training after becoming too comfortable with a vehicle operating in ADS mode. A training system may be provided through a vehicle manual, a driving school, a vehicle tutorial in parked mode, training in a special driving facility, a virtual training system, using special vehicle equipment, an interactive website, or the like. Training through these methods may be time-intensive, inconvenient, or ineffective at comprehensively training a driver of various experience levels. A system to train a driver of certain automated driving capabilities and limits may be difficult outside of the actual driving environment.

Furthermore, a driver may takeover vehicle control while a vehicle operates in ADS mode for a maneuver because of perceived dissatisfaction or lack of safety. The driver may be unaware, due to lack of knowledge or training, of ADS capabilities, ADS improvements, ADS updates, ADS safety features, ADS reliability, or the like. Therefore, the driver may unnecessarily intervene with control of the autonomous driving module(s) in certain scenarios resulting in reduced performance, inefficient manual mode operation, reduced safety, or the like. Current systems to train a driver through a manual, a virtual training system, an interactive website, or the like of ADS improvements, updates, safety features, or reliability are ineffective.

SUMMARY

In one embodiment, example systems and methods relate to a manner of improving the training of a driver for vehicle takeovers by the driver in automated driving system (ADS) mode while driving in a driving environment. Comprehensively training a driver about ADS capabilities, ADS improvements, ADS updates, ADS safety features, ADS reliability, or the like may be time-consuming, inconvenient, or ineffective when undertaken with the approaches noted above. The vehicle takeover by the driver from ADS mode may be unnecessary if an autonomous driving module(s) could have controlled the vehicle at least as well as the driver for a particular driving maneuver or scenario. Therefore, an improved approach to driver training is disclosed where a training system, in association with a vehicle takeover and maneuver by the driver, generates a projected ADS motion plan associated with the maneuver to determine if the takeover was unnecessary. In particular, the training system, in one or more arrangements, determines if a difference parameter satisfies a threshold. The difference parameter can be associated with a measure of disparity of the maneuver by the driver to the ADS motion plan associated with the maneuver. Accordingly, the training system determines, if the difference parameter does not satisfy the threshold, that the vehicle takeover and the maneuver by the driver were unnecessary. In one or more approaches, the training system then notifies the driver to educate the driver about the ADS capabilities. In this way, the driver learns of the necessity of vehicle takeovers to improve confidence, trust, and understanding of ADS operation for more reliable automated driving.

A system for improving the training of a driver during automated driving system mode is disclosed. In one embodiment, the training system includes one or more processors and a memory communicably coupled to the one or more processors. The memory stores a tracking module including instructions that when executed by the one or more processors cause the one or more processors to generate, in association with a vehicle takeover and a maneuver by the driver, an automated motion plan associated with the maneuver. The memory also stores a determination module including instructions that when executed by the one or more processors cause the one or more processors to determine if a difference parameter satisfies a threshold, wherein the difference parameter indicates a disparity between the maneuver by the driver in relation to the automated motion plan associated with the maneuver. The determination module also includes instructions to notify, if the difference parameter does not satisfy the threshold, the driver that the vehicle takeover and the maneuver by the driver were unnecessary.

In one embodiment, a non-transitory computer-readable medium for improving the training of a driver during automated driving system mode and including instructions that when executed by one or more processors cause the one or more processors to perform one or more functions is disclosed. The instructions include instructions to generate, in association with a vehicle takeover and a maneuver by the driver, an automated motion plan associated with the maneuver. The instructions also include instructions to determine if a difference parameter satisfies a threshold, wherein the difference parameter indicates a disparity between the maneuver by the driver in relation to the automated motion plan associated with the maneuver. The instructions also include instructions to notify, if the difference parameter does not satisfy the threshold, the driver that the vehicle takeover and the maneuver by the driver were unnecessary.

In one embodiment, a method for improving the training of a driver during automated driving system mode is disclosed. In one embodiment, the method includes generating, in association with a vehicle takeover and a maneuver by the driver, an automated motion plan associated with the maneuver. The method also includes determining if a difference parameter satisfies a threshold, wherein the difference parameter indicates a disparity between the maneuver by the driver in relation to the automated motion plan associated with the maneuver. The method also includes notifying, if the difference parameter does not satisfy the threshold, the driver that the vehicle takeover and the maneuver by the driver were unnecessary.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving the training of a driver for vehicle takeovers while a vehicle operates in an automated driving system (ADS) mode are disclosed herein. ADS mode may refer to, for example, navigating and/or maneuvering the vehicle along a travel route using a computing system(s) to control the vehicle with minimal or no input from a human driver. A training system teaches a driver when takeovers from ADS mode are most needed by giving feedback according to an analysis of the driver's maneuver after takeover. The feedback by the training system may be given according to a disparity from a maneuver by the driver while a vehicle operates in ADS mode to a motion plan associated with the maneuver. With respect to a notification, a message or notification signal may indicate to the driver that the vehicle takeover by the driver was unnecessary or necessary. The vehicle takeover by the driver while a vehicle operates in ADS mode may be unnecessary if the autonomous driving module(s) could have controlled the vehicle at least as well as the driver for a particular driving maneuver. The feedback by the training system may avoid future takeovers from ADS mode by showing the driver satisfactory vehicle maneuvers by the ADS.

Furthermore, the training system improves driver training about ADS capabilities, ADS improvements, ADS updates, ADS safety features, ADS reliability, or the like. The training system achieves this improvement, in one approach, by providing analysis of driving behaviors of a driver for a given maneuver while the vehicle operates with the ADS mode activated. For example, the training system determines a difference parameter associated with a measure of disparity between the maneuver by the driver and the ADS motion plan associated with the maneuver. The training system determines that the vehicle takeover and the maneuver by the driver were unnecessary if the difference parameter does not satisfy the threshold. A threshold may be satisfied, for example, according to a difference in physical parameters of distance, direction, speed, velocity, acceleration, deceleration time, etc. of a driver's action after the takeover in relation to an ADS motion plan. When the threshold is not satisfied, the training system notifies the driver that the takeover was unnecessary for driver training. In this way, the driver learns of the necessity of vehicle takeovers to improve confidence, trust, and understanding of ADS operation for more reliable automated driving.

Figure 1:
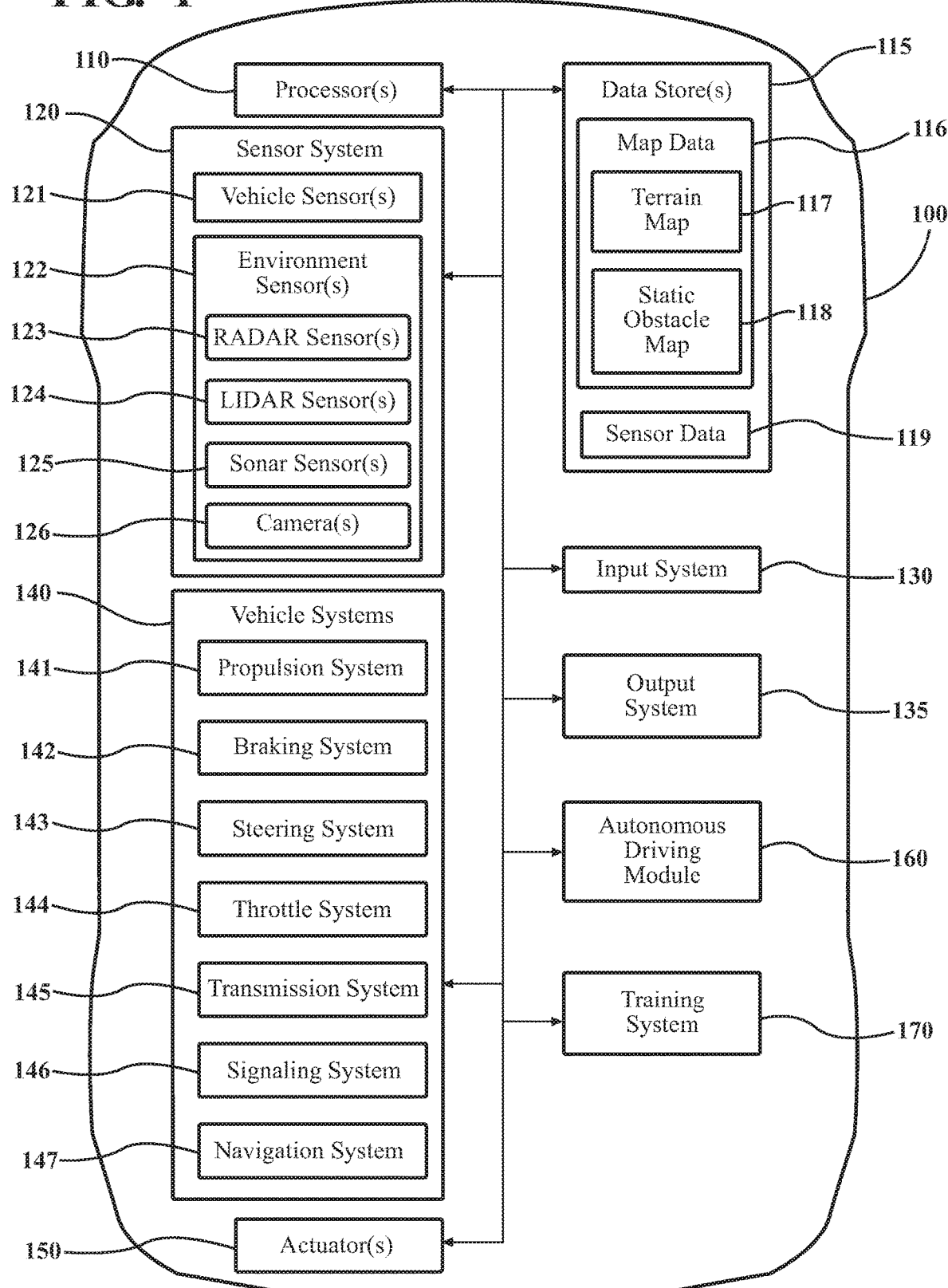
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with a training system for teaching a driver about the necessity of vehicle takeovers while the vehicle 100 operates in ADS mode. As further described herein, an ADS may comprise the autonomous driving module(s) 160, the parts of sensor system 120, the parts of vehicle systems 140, the actuators 150, and the data store(s) 115 that may operate together to autonomously drive and control the vehicle 100 in ADS mode. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments, the vehicle 100 having all of the elements shown in FIG. 1 may be unnecessary. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or another system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a training system 170 that is implemented to perform methods and other functions as disclosed herein relating to improving the training of a driver for vehicle takeovers while the vehicle 100 operates in ADS mode.

Figure 2:
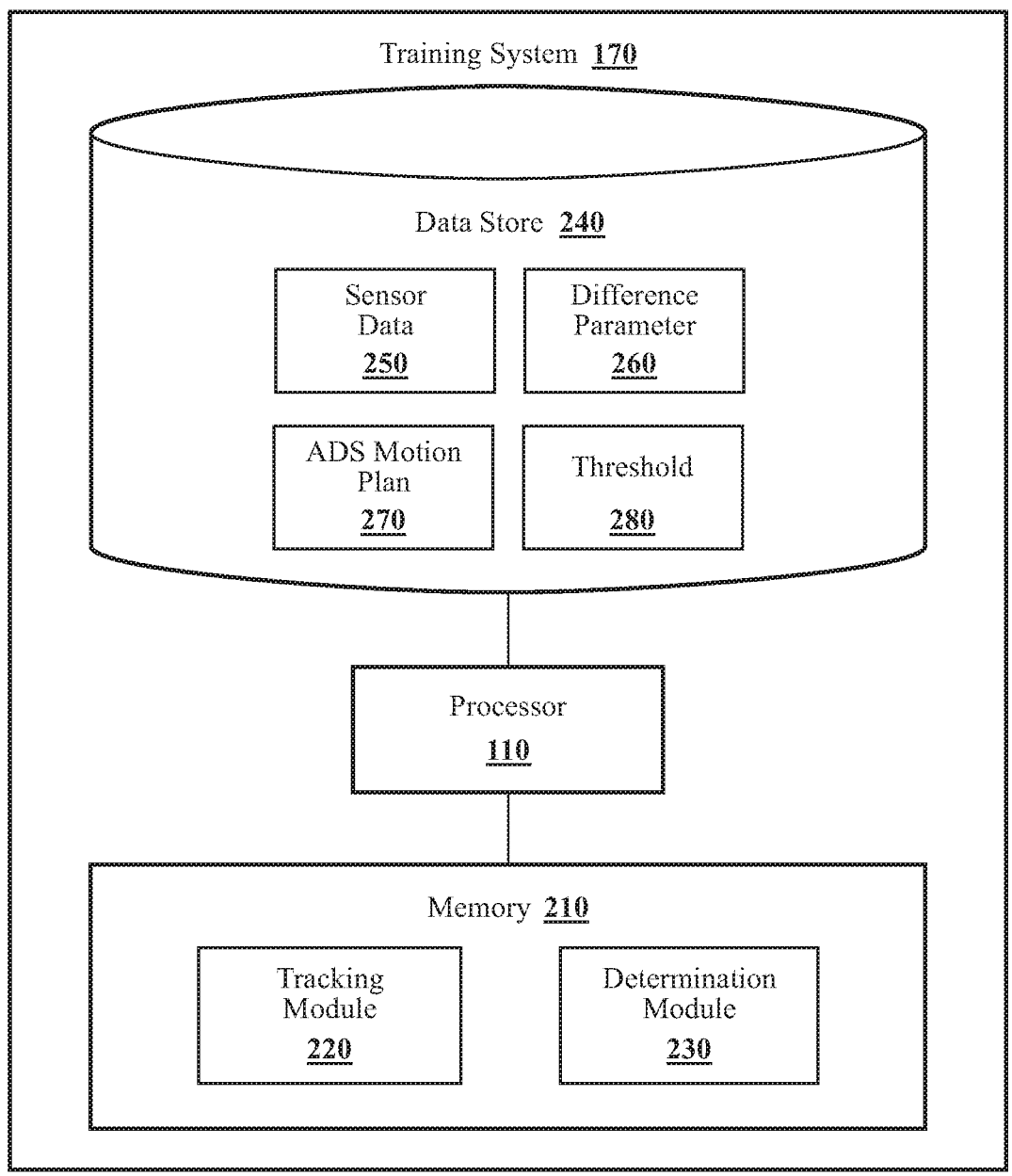
FIG. 2 illustrates one embodiment of a training system for training a driver for on-road vehicle takeovers by the driver in association with the automated driving system (ADS) capabilities for the vehicle in FIG. 1.

FIG. 2 illustrates one embodiment of a training system 170 for training a driver for on-road vehicle takeovers by the driver in association with ADS capabilities for the vehicle 100 in FIG. 1. The training system 170 is shown as including a processor 110 from the vehicle 100 of FIG. 1. Accordingly, the processor 110 may be a part of the training system 170, the training system 170 may include a separate processor from the processor 110 of the vehicle 100, or the training system 170 may access the processor 110 through a data bus or another communication path. In one embodiment, the training system 170 includes a memory 210 that stores a tracking module 220 and a determination module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

The training system 170 as illustrated in FIG. 2 is generally an abstracted form. The tracking module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the tracking module 220, in one embodiment, acquires sensor data 250 that includes at least camera images. In further arrangements, the tracking module 220 acquires the sensor data 250 from further sensors such as a radar, a light detection and ranging (LiDAR) sensor, and other sensors as may be suitable for identifying vehicles and locations of the vehicles.

Accordingly, the tracking module 220, in one embodiment, controls the respective sensors (e.g., inertial measurement unit (IMU), input sensors, etc.) to provide the data inputs in the form of the sensor data 250. Additionally, while the tracking module 220 is discussed as controlling the various sensors to provide the sensor data 250, in one or more embodiments, the tracking module 220 can employ other techniques to acquire the sensor data 250 that are either active or passive. For example, the tracking module 220 can passively sniff the sensor data 250 from a stream of electronic information provided by the various sensors to further components within the vehicle 100. Moreover, the tracking module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In general, the sensor data 250 includes at least the vehicle control inputs. The vehicle control inputs comprise, in one example, steering inputs (e.g., steering wheel angle, rate and direction of rotation, etc.), braking inputs (e.g., the extent of brake pedal activation/pressure), and acceleration inputs (e.g., the extent of accelerator pedal activation/pressure). In further aspects, the vehicle control inputs also specify transmission control inputs (e.g., gear selection), drive mode (e.g., 2-wheel drive, 4-wheel drive, etc.), engine/motor parameters (e.g., engine RPM, driving mode for hybrid vehicles, etc.), and so on. In yet further aspects, the sensor data 250 includes current dynamics data such as angular velocity, g-forces (e.g., longitudinal, lateral, etc.), speed profile, wheel speeds, activation controls (e.g., anti-lock brake system (ABS) activation, traction control activation, stability control activation, etc.), and so on.

Of course, depending on the sensors that the vehicle 100 includes, the available information that the training system 170 can harvest as the sensor data 250 may vary. As one example, according to a particular implementation, the vehicle 100 may include different versions of an IMU sensor that are separately capable of different measurements. That is, in one implementation, the IMU sensor may provide yaw rate, lateral acceleration, and longitudinal acceleration, whereas, in a separate implementation with a more robust IMU sensor, the IMU sensor may provide additional data such as pitch rates, roll rates, vertical acceleration, etc. As such, the modules 220 or 230 may, in one or more approaches, be configured to adapt to different electronic inputs depending on the availability of such information. As an additional note, telematics data, as used herein, generally encompasses the sensor data 250 and may include further information such as vehicle identifiers, location information (e.g., GPS position), and other information that may be used by training system 170 to determine travel plans by autonomous driving module(s) 160.

General observations of the surrounding environment include various obstacles detected by, for example, the sensor system 120 and stored in sensor data 250. For example, the sensor data 250 may include information about lane markings, traffic signs, side-walks, or the like. Moreover, the tracking module 220 may acquire the sensor data about a forward direction alone when, for example, the vehicle 100 is not equipped with further sensors to include additional regions about the vehicle and/or the additional regions are not scanned due to other reasons.

Moreover, in one embodiment, the training system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250.

In one embodiment, the data store 240 also includes the difference parameter 260, the automated or ADS motion plan 270, and the threshold 280. After vehicle takeover by the driver in ADS mode, the ADS mode may derive motion plans as if the ADS were controlling the vehicle. For example, the ADS may derive a difference parameter 260 that indicates a measurement of disparity between the distance of the maneuver by the driver, while the vehicle 100 operates in ADS mode, in relation to the ADS motion plan associated with the maneuver. Thus, the difference parameter 260 can indicate a disparity between the planned maneuvers from the ADS and actual maneuvers performed by the driver.

Furthermore, the ADS motion plan 270 is generated by the tracking module 220 to determine the likely lateral trajectory, vertical trajectory, or path factors of the vehicle if the driver did not intervene. The threshold 280 can be, for example, a parameter or value that is equal to, greater than, or less than a measurement of the disparity. As further explained herein, these and more factors related to the threshold may be satisfied exactly or in varying amounts for determining disparity and the necessity of vehicle takeover or disengagement of vehicle ADS mode by the driver. The autonomous driving module(s) 160 gives feedback to the driver of the disparity so that the driver learns about the need for vehicle takeover and disengagement while the vehicle operates in ADS mode.

Moreover, a machine learning algorithm may be utilized by the tracking module 220 or the determination module 230 to determine ADS motion plan 270 associated with the driver's maneuver. The training system 170 may also use machine learning to train the autonomous driving module(s) 160 according to outputs or results from the determination module 230. For example, a convolutional neural network (CNN) may perform semantic segmentation over the sensor data 250 to derive the ADS motion plan 270. Of course, in further examples, the tracking module 220 or the determination module 230 employs different machine learning algorithms or implements different approaches for performing the associated functions.

Continuing with FIG. 2 and the manner in which the training system 170 implements the driver training, the tracking module 220 may be further configured to perform additional tasks beyond controlling the respective sensors to acquire and provide the sensor data 250. For example, the tracking module 220 generates, in association with a maneuver by the driver in performing a vehicle takeover, an ADS motion plan associated with the maneuver. Furthermore, the determination module 230 determines if a difference parameter satisfies a threshold. The difference parameter may indicate a disparity between the maneuver by the driver in relation to the ADS motion plan associated with the maneuver.

In the forthcoming examples, the training system 170 utilizes the sensor data 250, the difference parameter 260, the ADS motion plan 270, and/or the threshold 280 stored in the data store 240 to train a driver about a vehicle takeover while a vehicle operates in ADS that may be unnecessary. In particular, the tracking module 220 uses, for example, the sensor data 250 to generate, in association with a vehicle takeover and a maneuver by the driver, an ADS motion plan associated with the maneuver. The determination module 230 analyzes the necessity of the takeover or driver actions to improve ADS control. For example, if the determination module 230 and/or the training system 170 determine that the difference parameter 260 is not satisfied, the driver is notified that the vehicle takeover was unnecessary. Accordingly, notifying the driver of an unnecessary takeover immediately after a driving event can teach a driver the types or controls and actions needed for different driving events. As a result, the training system 170 teaches the driver of the necessity for the takeover to improve understanding of ADS capabilities and limitations.

Figure 3:
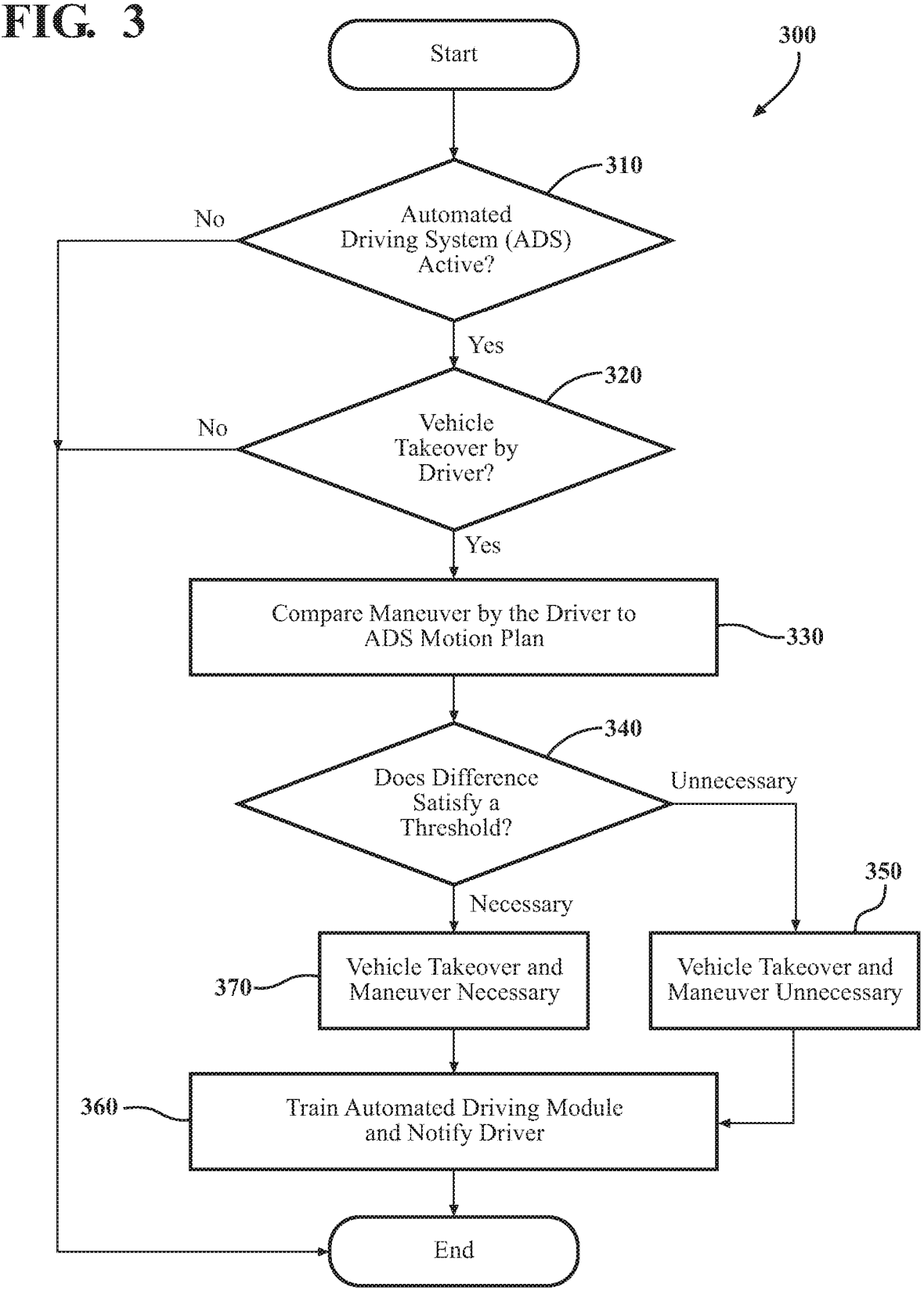
FIG. 3 illustrates one embodiment of a method that is associated with training a driver for on-road vehicle takeovers in association with ADS capabilities.

Referring now to FIG. 3, one embodiment of a method 300 that is associated with training a driver for on-road vehicle takeovers in association with ADS capabilities is illustrated. Method 300 will be discussed from the perspective of the training system 170 of FIGS. 1 and 2. While method 300 is discussed in combination with the training system 170, it should be appreciated that the method 300 is not limited to being implemented within the training system 170 but is instead one example of a system that may implement the method 300.

As a brief introduction to the method 300, prior to the discussion of the explicitly identified functions, the training system 170 determines if a vehicle takeover by a driver is necessary or unnecessary. The driver of a vehicle may prematurely takeover the vehicle 100 while operating in ADS mode due to dissatisfaction, disaffection, safety concerns, or the like. The necessity is determined, such as by tracking module 220 and determination module 230, by comparing a maneuver by a driver, such as steering to avoid another vehicle, to an ADS motion plan. For example, if a difference in time or distance between the two maneuvers is similar and fails to meet a threshold, the training system 170 determines that takeover was unnecessary. The autonomous driving module(s) 160 may then be trained by a machine learning module to improve motion control and driver behavior parameters for the driving event so that takeover may be avoided by the driver. The training system 170 may notify the driver using a message or notification signal of the unnecessary maneuver for driver training. Alternatively, if the difference in maneuvers satisfies a threshold, the driver is notified that the maneuver was necessary to learn about ADS limitations.

Figure 4:
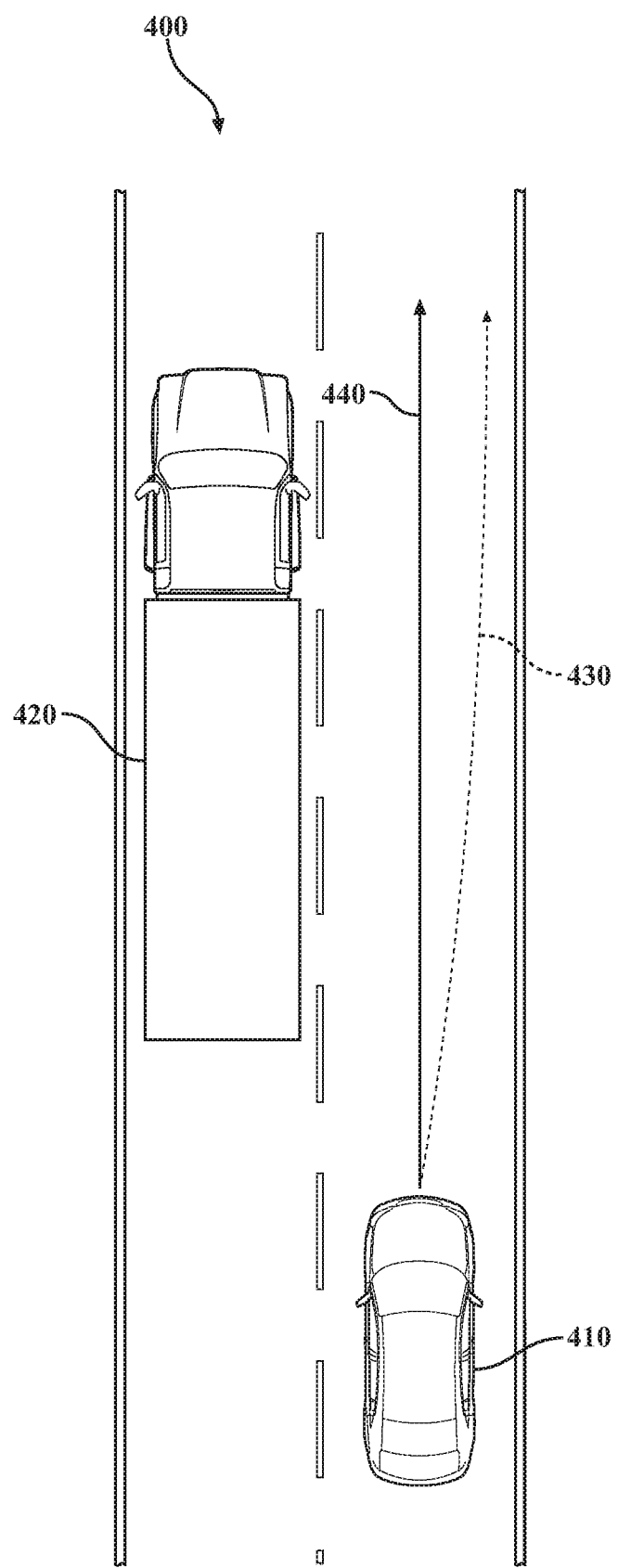
FIG. 4 illustrates one embodiment of training a driver for on-road vehicle takeovers by observing driver and ADS maneuvers.

For an example of comparing maneuvers, FIG. 4 illustrates one embodiment of training a driver for on-road vehicle takeovers by observing driver and ADS maneuvers 400. In a driving environment, vehicle 410 may travel in the right lane in active ADS mode while the truck 420 travels in the left lane on the road. Due to dissatisfaction, disaffection, or safety concerns, the driver of vehicle 410 may prematurely takeover the vehicle to steer right of the center lane path 440 to the desired path 430, to keep a distance from the truck 420. The maneuver by the driver is taken before allowing the autonomous driving module(s) 160 to steer to the desired path 430. In this example, the takeover by the driver is redundant or unnecessary since the autonomous driving module(s) 160 was also going to steer the vehicle to the desired path 430.

Referring again to determining unnecessary takeovers in FIG. 3, in method 300 at 310 if the ADS is active, the training system 170 waits until a driver performs a vehicle takeover. At 320, the training system 170 may detect a driver takeover of a vehicle. The driver may takeover because of an imminent or perceived safety concern. For example, the driver may perceive that from the path or speed of the vehicle 100 while operating in ADS mode, a dangerous scenario or collision is imminent. The driver takeovers due to safety, lack of confidence, lack of trust, or the like of the autonomous driving module(s) 160 control of vehicle 100 to avoid the collision.

At 330, the tracking module 230 generates, in association with the vehicle takeover and a maneuver by the driver, an ADS motion plan associated with the maneuver. A maneuver, for example, may be a lane change, swerving, sudden braking, or the like. As further illustrated later in FIGS. 7-9, a difference parameter is determined according to a disparity between the maneuver by the driver in relation to the ADS motion plan associated with the maneuver. For example, the difference parameter may be a value of a difference of time, distance, or distance and time associated with the disparity of maneuvers. The training system 170 can use the difference parameter to determine if a threshold is satisfied. A threshold may be satisfied according to a difference in physical parameters of distance, direction, speed, velocity, acceleration, deceleration time, etc. of a driver's action after takeover in relation to a potential ADS motion plan. The physical parameters may also be combined or used individually to determine the differences.

At 340, the determination module 230 determines if the difference parameter 260 satisfies the threshold. Training system 170 may use this operation to determine the quality of the motion plan by the ADS. The result of the operation may indicate if the vehicle takeover by the driver was necessary.

At 350, the determination module 230 determines that the threshold is not satisfied and the vehicle takeover and maneuver by the driver were unnecessary. Accordingly, at 360 the autonomous driving module(s) 160 is trained in association with the training system 170 to improve motion control for a maneuver so that takeover may be avoided by the driver. For example, the autonomous driving module(s) 160 may adjust the coefficient of acceleration, slip parameters, distance margin parameters to objects, behavior models, or the like. The training system 170 notifies the driver of the unnecessary maneuver for driver training of vehicle takeovers. With the feedback, the driver behavior is improved to avoid early or premature takeover next time for a similar driving event.

At 370, the determination module 230 determines that the threshold is satisfied and the vehicle takeover and maneuver by the driver were necessary. Similar to not satisfying the threshold, the autonomous driving module(s) 160 is trained to improve motion control for the driving event so that takeover may be avoided by the driver for different driving environments. The driver again is notified of the necessary maneuver for driver training of vehicle takeovers.

Figure 5:
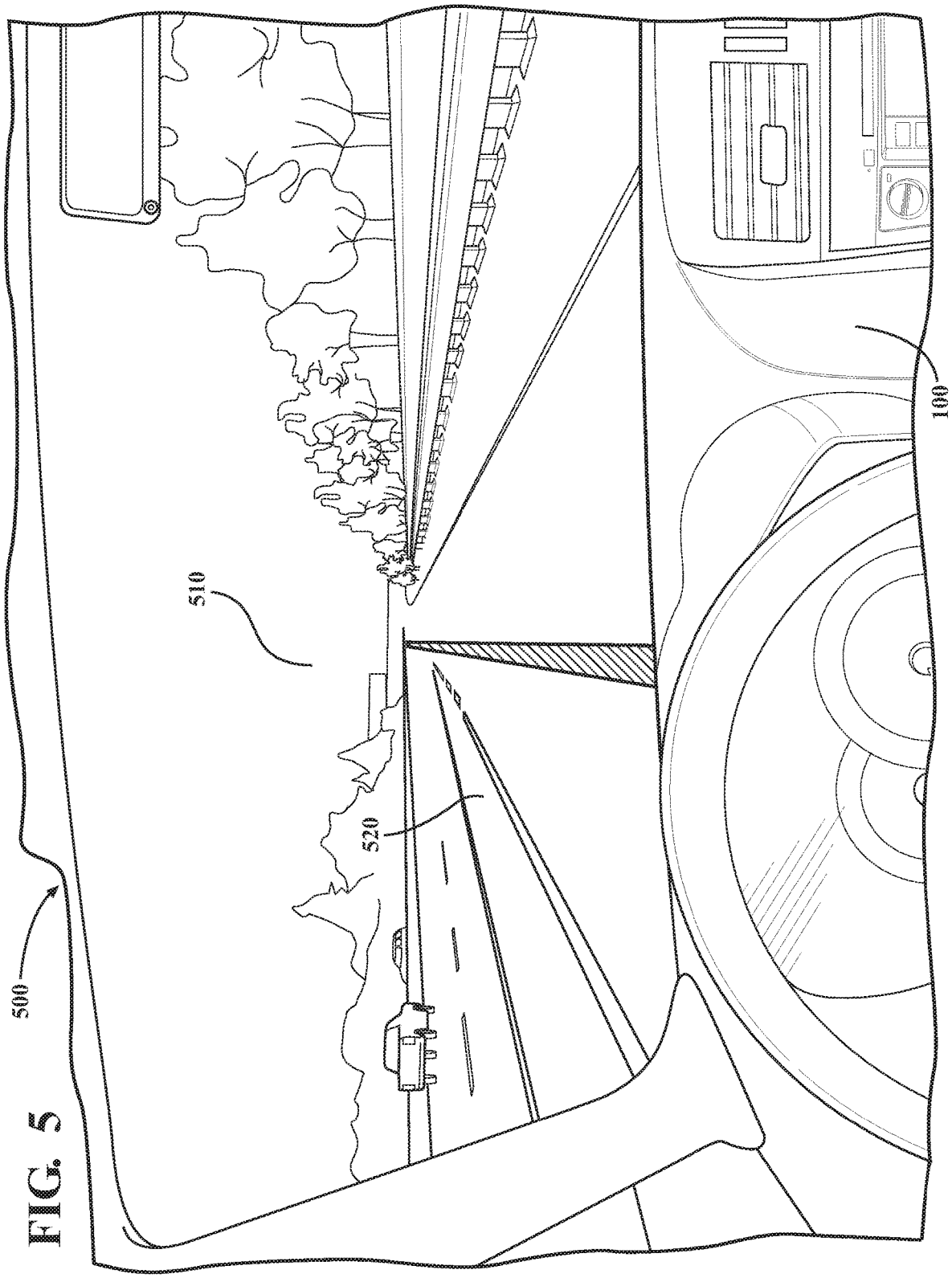
FIG. 5 illustrates one example of a vehicle driving environment.

FIG. 5 illustrates one example of a vehicle driving environment 500. In FIG. 5, the premature takeover by a driver in an expressway driving environment is illustrated. The driving environment 510 may include the vehicle 100 traveling on the expressway 520. Similar to the observing driver and ADS maneuvers 400, the driver may unnecessarily takeover driving while a vehicle operates in ADS mode to avoid a risky path or potential collision when passing the vehicle in the left lane. The takeover or disengagement may be a result of poor expectations by the driver of the autonomous driving module(s) 160 controlling the vehicle on the expressway 520 for the driving scenario. Accordingly, the operation by training system 170 may train the driver to avoid this takeover when unnecessary.

Figure 6:
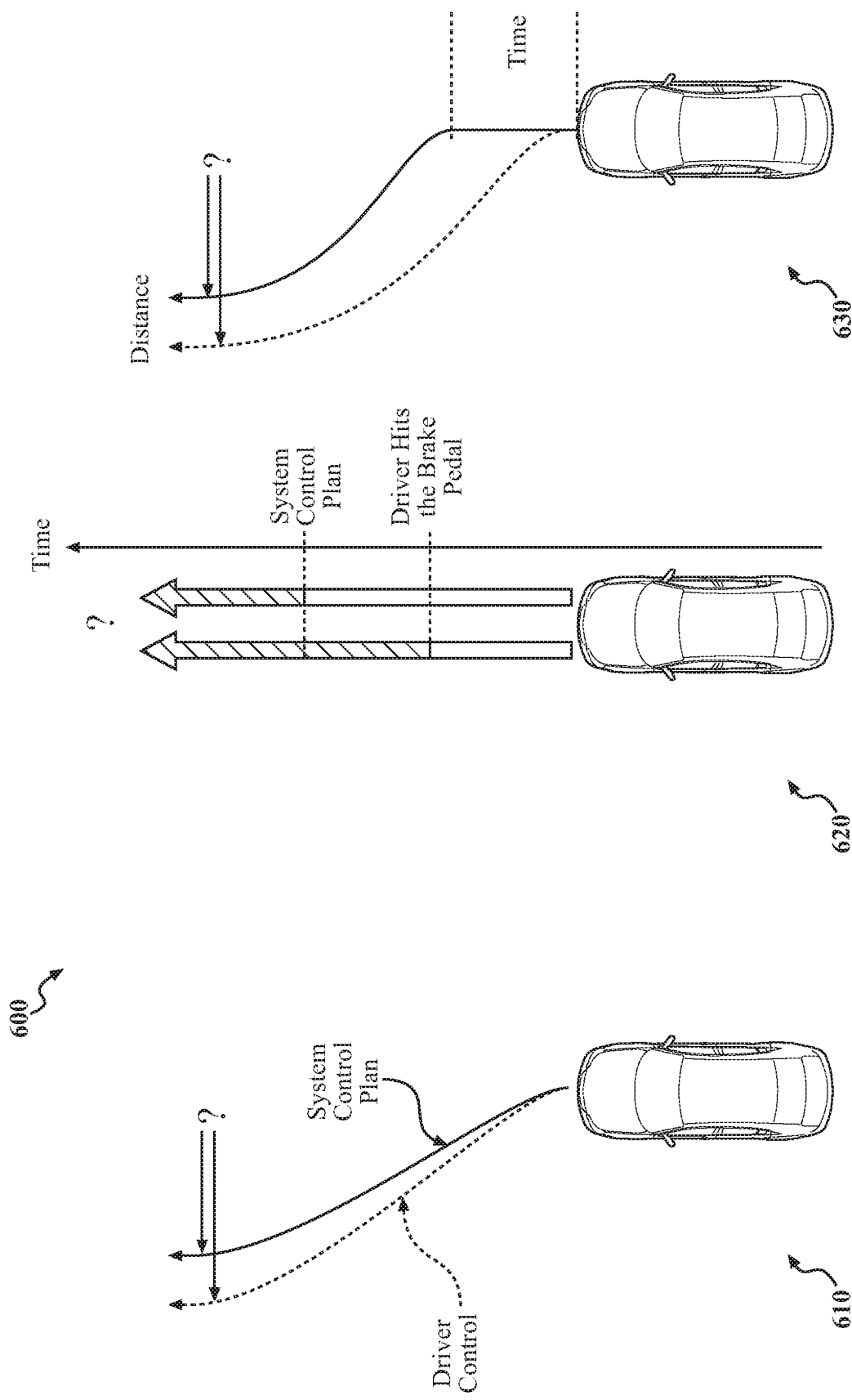
FIG. 6 illustrates one embodiment of training a driver for on-road vehicle takeovers by comparing the driver and ADS maneuvers for lateral movement or braking.

FIG. 6 illustrates one embodiment of training a driver for on-road vehicle takeovers by the driver by comparing the driver and ADS maneuvers for lateral movement or braking 600. In FIG. 6, comparing disparity between the driver control of a maneuver and an ADS motion plan for three different driving events to determine the necessity of takeover is illustrated. For the lateral maneuver 610 of the vehicle 100 after the takeover by the driver, the difference in distance between the performed driver control path and the potential ADS system control plan is analyzed by the tracking module 220 and the determination module 230. To determine driver control path or the ADS system control plan, the autonomous driving module(s) 160 may collect data using the one or more cameras 126 to record images and videos, GPS of the navigation system 147 to determine the positioning of the vehicle 100, or the like.

Furthermore, if the distance does not satisfy a threshold, the driver control maneuver was unnecessary. Similarly, for a difference in time from the premature braking 620 of the vehicle 100 after the takeover by the driver, the difference in time between the driver hitting the pedal and the potential ADS system control plan is analyzed by the tracking module 220 and the determination module 230. If the time difference does not satisfy a threshold, the driver control maneuver was unnecessary. Lastly, for the maneuver 630 after the takeover by the driver of the vehicle 100, the difference in distance and time between the performed driver control path and the potential motion plan is analyzed by the tracking module 220 and the determination module 230. If the driver steers and brakes the vehicle 100 before autonomous driving module(s) 160 steered and braked, the lateral distance between the vehicle's current position and the position the vehicle 100 under ADS control is measured and analyzed. The time difference between the driver braking the vehicle 100 and when the ADS would have braked is also measured. If the distance and time do not satisfy a threshold, the driver control maneuver was unnecessary.

According to the analysis in relation to 610, 620, and 630, the autonomous driving module(s) 160 may be trained to improve motion control for a takeover and a maneuver by a driver to avoid unnecessary takeovers. With the feedback, the driver behavior may be improved to avoid early or premature takeover next time for a similar driving event. For training, the training system notifies the driver that takeover was unnecessary to improve behavior and increase trust in the ADS.

Figure 7:
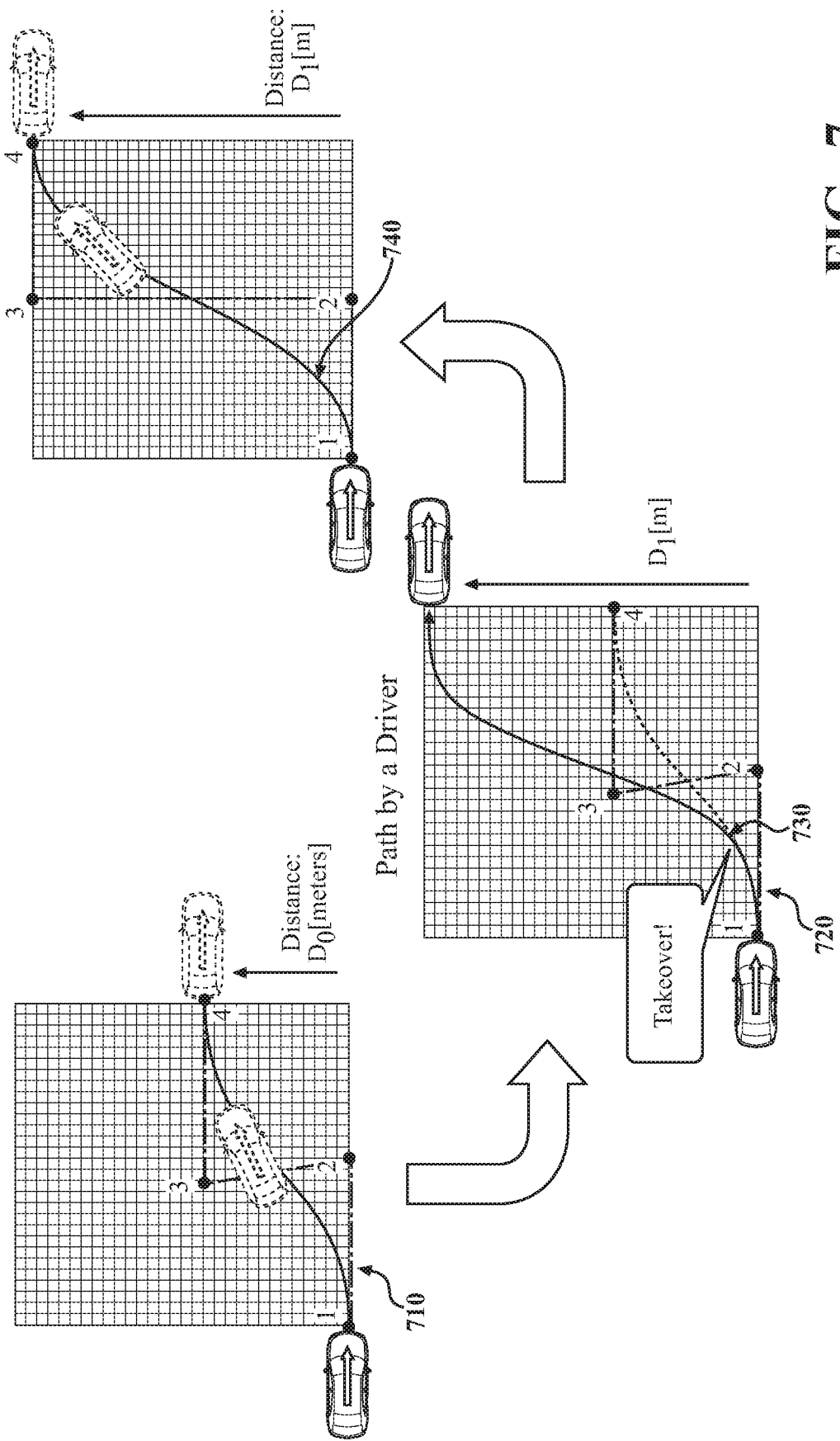
FIG. 7 illustrates another embodiment of training a driver where a disparity in the distance is analyzed between a driver's maneuver and a motion path of the maneuver after vehicle takeover.

FIG. 7 illustrates another embodiment of training a driver where a disparity in the distance is analyzed between a driver's maneuver and a motion path of the maneuver after vehicle takeover. In FIG. 7, the autonomous driving module(s) learns and adapts motion plans according to differences in distance between an observed driver's controlled maneuver and a potential motion path. The autonomous driving module(s) 160 may plan the potential motion path 710. For example, a Bezier curve may be used to model the potential motion path 710 to determine the distance $D_0$ meters using measurement points 1-4. The distance $D_0$ meters measures distance between the beginning and end position of the potential motion path 710. The potential motion path 710 is compared to the driver's controlled maneuver 720 after the takeover 730. For example, tracking module 220 may determine the driver's controlled maneuver 720 using measurement points 1-4.

The distance $D_1$ meters is determined using measurement points 1-4 for the driver's controlled maneuver 720. The distance $D_1$ meters measures distance between the beginning and end position of the driver's controlled maneuver 720. The distance $D_1$ meters is compared to the distance $D_0$ meters. The distance $D_1$ meters may be greater than or less than, but not equal to, the $D_0$ meters. As a result of the comparison, an adjusted motion path 740 is planned and the autonomous driving module(s) 160 parameters are tuned according to the distance differences between $D_0$ and $D_1$. The adjusted motion path 740 may avoid takeover in the future of a similar driving event. For example, motion planning is performed by autonomous driving module(s) 160 so that parameters relevant to a motion plan are adjusted to satisfy a threshold, such as the threshold 280, relative to dimension $D_1$ meters.

Figure 8:
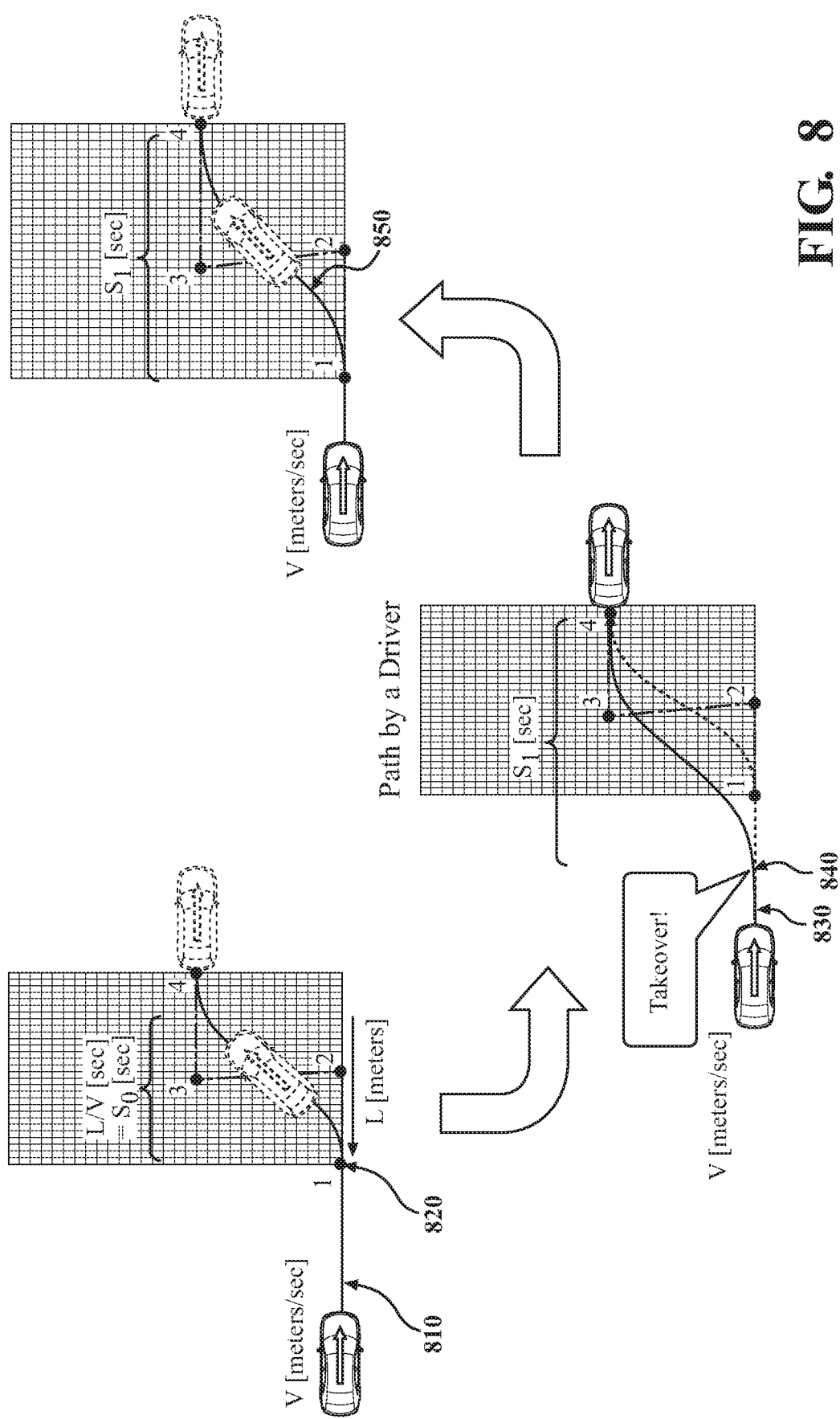
FIG. 8 illustrates another embodiment of training a driver where a disparity in an elapsed time is analyzed between a driver's maneuver and a motion path of the maneuver after vehicle takeover.

FIG. 8 illustrates another embodiment of training a driver where a disparity in elapsed time is analyzed between a driver's maneuver and a motion path of the maneuver after vehicle takeover. In FIG. 8, the autonomous driving module(s) 160 learns and adapts motion plans according to differences in time between an observed driver's controlled maneuver and a potential motion path. A vehicle travels on initial path 810 with a velocity of V meters/sec. The potential motion path 820 is planned by autonomous driving module(s) 160 to steer in a new direction. The elapsed time for the potential motion path 820 is determined as $S_0$ seconds from distance L meters using measurement points 1-4 by calculating L/V. The potential motion path 820 is compared to the driver's controlled maneuver 830 after the takeover 840. The elapsed time $S_1$ seconds for the driver's controlled maneuver 830 may be determined using measurement points 1-4 for the driver's controlled maneuver 830. The elapsed time $S_1$ seconds is compared to the lapsed time $S_0$ seconds. Parameter $S_1$ seconds may be greater than or less than, but not equal to, the $S_0$ seconds. As a result of the comparison, an adjusted motion path 850 is planned and autonomous driving module(s) 160 parameters are tuned according to the elapsed time differences between $S_0$ and $S_1$ to avoid takeover in the future of a similar driving event. For example, motion planning is performed by autonomous driving module(s) 160 so that parameters relevant to a motion plan are adjusted to satisfy a threshold, such as the threshold 280, relative to elapsed time $S_1$ seconds.

Figure 9:
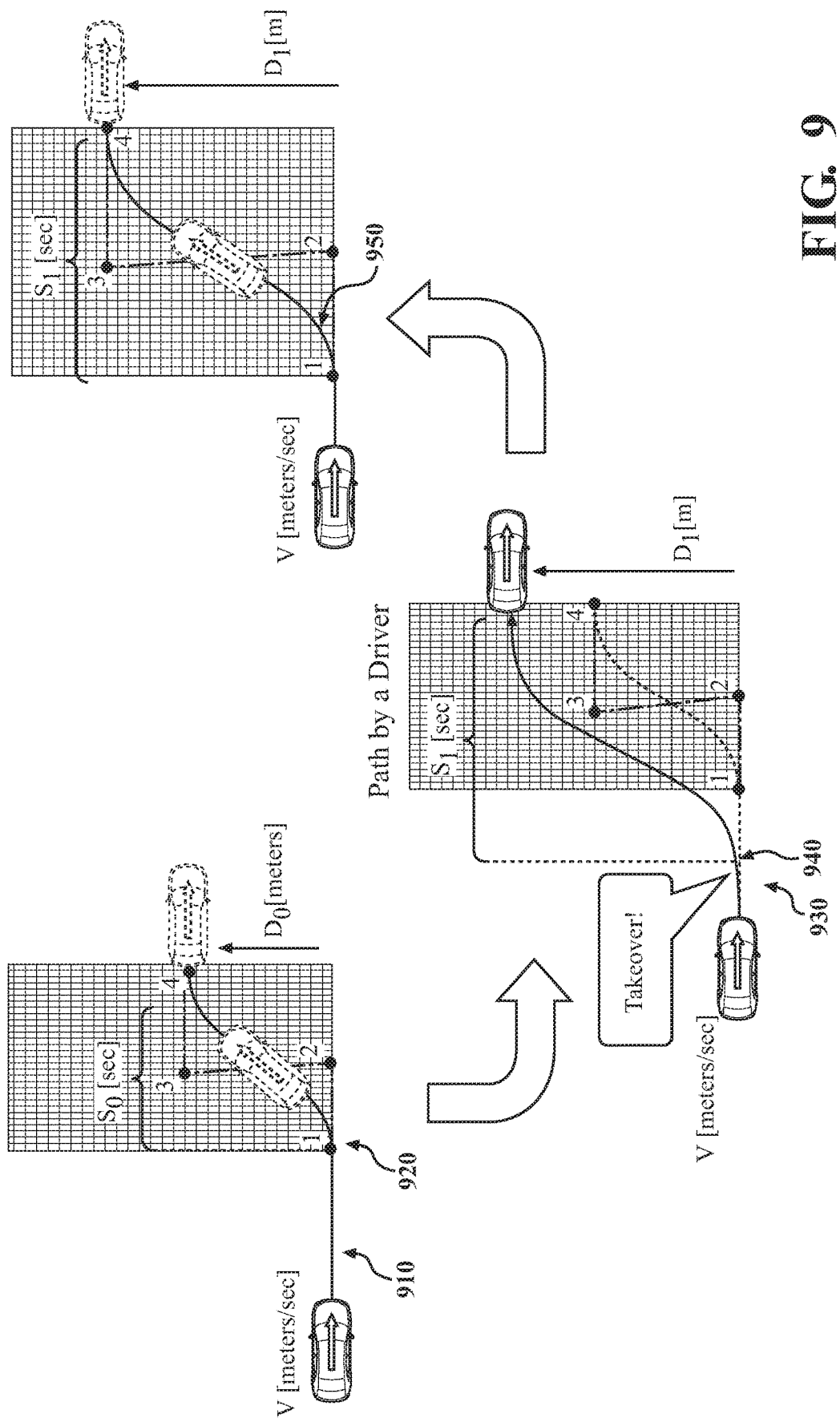
FIG. 9 illustrates another embodiment of training a driver where a disparity in the distance and elapsed time are analyzed between a driver's maneuver and a motion path of the maneuver after vehicle takeover.

FIG. 9 illustrates another embodiment of training a driver where a disparity in the distance and elapsed time are analyzed between a driver's maneuver and a motion path of the maneuver after vehicle takeover. In FIG. 9, the autonomous driving module(s) 160 learns and adapts motion plans according to differences in time and distance between an observed driver's controlled maneuver and a potential motion path. A vehicle travels on the initial path 910 with a velocity of V meters/sec. The potential motion path 920 is planned by the autonomous driving module(s) 160 to steer in a new direction. The elapsed time for the potential motion path 920 is determined as $S_0$ seconds from distance L meters, using measurement points 1-4, by calculating L/V. The distance $D_0$ meters is determined using measurement points 1-4.

The potential motion path 920 is compared to the driver's controlled maneuver 930 after the takeover 940. The elapsed time $S_1$ seconds and the distance $D_1$ meters for the driver's controlled maneuver 930 may be determined relative to measurement points 1-4. The elapsed time $S_1$ seconds is compared to the elapsed time $S_0$ seconds. The distance $D_1$ meters is compared to the distance $D_0$ meters. For example, the parameter $S_1$ seconds may not be equal to $S_0$ seconds. Also, the distance $D_1$ meters may not be equal to the distance $D_0$ meters. As a result of the comparison, an adjusted motion path 950 is planned and autonomous driving module(s) 160 parameters are tuned according to the elapsed time differences between $S_0$ and $S_1$ and the distance differences between $D_0$ and $D_1$ relative to a threshold, such as threshold 280. The adjusted motion path 950 may be planned by autonomous driving module(s) 160 to avoid takeover in the future of a similar driving event.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As an autonomous vehicle, vehicle 100 may be configured to use an ADS to perform autonomous functions through the autonomous driving module(s) 160. As used herein, "autonomous vehicle" refers to a vehicle that is capable of operating in an autonomous, automated, or ADS mode (e.g., category 5, full automation). "Autonomous mode" or ADS mode refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain map(s) 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect a position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate to the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangements or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the training system 170, and/or the autonomous driving module(s) 160 can be operatively connected to communicate with the various vehicle systems 140 and/or individual components thereof. For example, the processor(s) 110 and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140 and, thus, may be partially or fully autonomous as defined by the Society of Automotive Engineers (SAE) 0 to 5 levels.

As another example, the processor(s) 110, the training system 170, and/or the autonomous driving module(s) 160 can be operatively connected to communicate with the various vehicle systems 140 and/or individual components thereof. For example, the processor(s) 110, the training system 170, and/or the autonomous driving module(s) 160 can be in communication to send and/or receive information from the various vehicle systems 140 to control the movement of the vehicle 100. The processor(s) 110, the training system 170, and/or the autonomous driving module(s) 160 may control some or all of the vehicle systems 140.

The processor(s) 110, the training system 170, and/or the autonomous driving module(s) 160 may be operable to control the navigation and maneuvering of the vehicle 100 by controlling one or more of the vehicle systems 140 and/or components thereof. For instance, when operating in an automated or autonomous mode, the processor(s) 110, the training system 170, and/or the autonomous driving module(s) 160 can control the direction and/or speed of the vehicle 100. The processor(s) 110, the training system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or an indirect manner.

The vehicle 100 can include one or more actuators 150. The actuators 150 can be an element or a combination of elements operable to alter one or more of the vehicle systems 140 or components responsive to receiving signals or other inputs from the processor(s) 110 and/or the autonomous driving module(s) 160. For instance, the one or more actuators 150 can include motors, pneumatic actuators, hydraulic pistons, relays, solenoids, piezoelectric actuators, or the like.

The vehicle 100 can include one or more modules, at least some of which are described herein. The modules can be implemented as computer-readable program code that, when executed by the processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the training system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by an occupancy module. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, reversing, or the like. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or an indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), ROM, an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A training system for improving training of a driver during automated driving system (ADS) mode, comprising:
   one or more processors;
   a memory communicably coupled to the one or more processors and storing:
   a tracking module including instructions that when executed by the one or more processors cause the one or more processors to generate, after a vehicle takeover and a maneuver by the driver that disengages the ADS, an automated motion plan projected for the maneuver; and
   a determination module including instructions that when executed by the one or more processors cause the one or more processors to:
      determine if a difference parameter satisfies a threshold, wherein the difference parameter indicates a disparity in space between the maneuver by the driver and the automated motion plan projected for the maneuver; and
      notify, if the difference parameter does not satisfy the threshold, the driver that the vehicle takeover and the maneuver by the driver were unnecessary.

2. The training system of claim 1, wherein the determination module further includes instructions to notify the driver, on a condition that the difference parameter satisfies the threshold, that the vehicle takeover and the maneuver by the driver were necessary.

3. The training system of claim 1 further comprising an automated driving module including instructions that when executed by the one or more processors cause the one or more processors to train the automated driving module according to the vehicle takeover and the maneuver by the driver being unnecessary or necessary.

4. The training system of claim 1 further comprising an automated driving module including instructions that when executed by the one or more processors cause the one or more processors to train a model by adjustment of behavior parameters for the driver according to a distance or a time of the disparity of the maneuver by the driver in relation to the automated motion plan projected for the maneuver and semantic information associated with the maneuver.

5. The training system of claim 1, wherein the determination module determines the difference parameter according to a difference in distance of a lateral trajectory of the maneuver by the driver and the automated motion plan to avoid a collision with another vehicle.

6. The training system of claim 1, wherein the determination module determines the difference parameter according to a comparison of the driver prematurely braking to avoid a collision, and the automated motion plan projected for the maneuver later braking in the space to avoid the collision.

7. The training system of claim 1, wherein the difference parameter comprises a value of a difference of time, distance, or distance and time associated with the disparity.

8. A non-transitory computer-readable medium for improving training of a driver during automated driving system (ADS) mode and including instructions that when executed by one or more processors cause the one or more processors to:
generate, after a vehicle takeover and a maneuver by the driver that disengages the ADS, an automated motion plan projected for the maneuver;
determine if a difference parameter satisfies a threshold, wherein the difference parameter indicates a disparity in space between the maneuver by the driver and the automated motion plan projected for the maneuver; and
notify, if the difference parameter does not satisfy the threshold, the driver that the vehicle takeover and the maneuver by the driver were unnecessary.

9. The non-transitory computer-readable medium of claim 8, wherein the instructions further include instructions to notify the driver, on a condition that the difference parameter satisfies the threshold, that the vehicle takeover and the maneuver by the driver were necessary.

10. The non-transitory computer-readable medium of claim 8, wherein the instructions further include instructions that when executed by the one or more processors cause the one or more processors to train a model by adjustment of behavior parameters for the driver according to a distance or a time of the disparity of the maneuver by the driver in relation to the automated motion plan projected for the maneuver and semantic information associated with the maneuver.

11. The non-transitory computer-readable medium of claim 8, wherein the instructions to determine further include instructions to determine the difference parameter according to a difference in distance of a lateral trajectory of the maneuver by the driver and the automated motion plan to avoid a collision with another vehicle.

12. The non-transitory computer-readable medium of claim 8, wherein the instructions to determine further include instructions to determine the difference parameter according to a comparison of the driver prematurely braking to avoid a collision, and the automated motion plan projected for the maneuver later braking in the space to avoid the collision.

13. The non-transitory computer-readable medium of claim 8, wherein the difference parameter comprises a value of a difference of time, distance, or distance and time associated with the disparity.

14. A method for improving training of a driver during automated driving system (ADS) mode, comprising:
generating, after a vehicle takeover and a maneuver by the driver that disengages the ADS, an automated motion plan projected for the maneuver;
determining if a difference parameter satisfies a threshold, wherein the difference parameter indicates a disparity in space between the maneuver by the driver and the automated motion plan projected for the maneuver; and
notifying, if the difference parameter does not satisfy the threshold, the driver that the vehicle takeover and the maneuver by the driver were unnecessary.

15. The method of claim 14 further comprising notifying the driver, on a condition that the difference parameter satisfies the threshold, that the vehicle takeover and the maneuver by the driver were necessary.

16. The method of claim 14 further comprising training an automated driving module according to the vehicle takeover and the maneuver by the driver being unnecessary or necessary.

17. The method of claim 14 further comprising training a model by adjusting behavior parameters for the driver according to a distance or a time of the disparity of the maneuver by the driver in relation to the automated motion plan projected for the maneuver and semantic information associated with the maneuver.

18. The method of claim 14 further comprising determining the difference parameter according to a difference in distance of a lateral trajectory of the maneuver by the driver and the automated motion plan to avoid a collision with another vehicle.

19. The method of claim 14 further comprising determining the difference parameter according to a comparison of the driver prematurely braking to avoid a collision, and the automated motion plan projected for the maneuver includes later braking in the space to avoid the collision.

20. The method of claim 14, wherein the difference parameter comprises a value of a difference of time, distance, or distance and time associated with the disparity.

* * * * *